United States Patent [19]

Ernst et al.

[11] 4,128,279

[45] Dec. 5, 1978

[54] LINEAR MOTION BALL BEARINGS

[75] Inventors: Horst M. Ernst, Eltingshausen; Armin Olschewski; Lothar Walter, both of Schweinfurt; Manfred Brandenstein, Aschfeld; Toni Schulz, Dittelbrunn, all of Fed. Rep. of Germany

[73] Assignee: SKF Kugellagerfabriken GmbH, Schweinfurt, Fed. Rep. of Germany

[21] Appl. No.: 845,227

[22] Filed: Oct. 25, 1977

[30] Foreign Application Priority Data

Oct. 29, 1976 [DE] Fed. Rep. of Germany ....... 2649245

[51] Int. Cl.[2] ............................................ F16C 29/06

[52] U.S. Cl. ..................................... 308/6 C; 64/23.7

[58] Field of Search ........ 308/6 C, 6 B, 6 R, DIG. 7, 308/DIG. 8, 201; 64/23.7, 23; 29/148.4 C

[56] References Cited

U.S. PATENT DOCUMENTS

| | | | |
|---|---|---|---|
| 2,493,342 | 1/1950 | Eldred et al. | 308/6 C X |
| 3,879,093 | 4/1975 | Betrix | 308/6 C |

*Primary Examiner*—Trygve M. Blix
*Assistant Examiner*—Douglas C. Butler
*Attorney, Agent, or Firm*—Daniel M. Rosen

[57] ABSTRACT

A linear-motion ball bearing assembly wherein a metal cylindrical shell has an inner bore surface defining load zones and outwardly spaced return passages for balls in endless raceways; the shell has outwardly extending longitudinal ribs, with plastic injection molded onto the bore of the shell to form guide walls for balls in the load zone and along the ribs of the shell to form return guide passages communicating with the load zone passages.

13 Claims, 6 Drawing Figures

5 3 B 1 2 7

B 7
2
1
B
3
5
B 8
1
7
10
A
4
A

LINEAR MOTION BALL BEARINGS

BACKGROUND OF THE INVENTION

The present invention relates to a linear-motion ball bearing assembly. Around the circumference of such bearing assemblies are continuous circulating ball races with balls under load being supported in the bore of a metallic supporting shell or sleeve and balls not under load being turned around at the ends of the shell and returned via the casing surface of the shell.

The prior art includes a ball bearing of this type, in which the balls under load are guided longitudinally in a transversely divided cage shell or sleeve consisting of two cage half sections, whereby the outer end of each half section of the cage is thickened radially for the purpose of taking up the guidance part, as shown in German Utility Pat. No. 7,014,919. This known ball bearing has the disadvantage that, in addition to the supporting shell, an exterior shell must be provided which includes in its bore the supporting shell and the two halves of the cage, which must be tightly held axially and radially in the bore. In addition, considerable manufacturing costs are associated with providing the opposite ends of the two halves of the cage with plug-in contact, so that the two halves of the cage are fixed to one another without being able to rotate, and an exactly aligned longitudinal guidance of the balls under load is ensured in the cage shell. Finally, the cage shell of the known ball bearing can easily have defects, if it is manufactured from an abrasion-resistant plastic which can be injection molded, as is desirable for manufacturing and functional reasons, because the halves of the cage have a significantly greater wall thickness at their outer thickened end than at their inner end. Accordingly, damaging heat tensions may result when the cage halves are injection molded, and shrinkage after injection molding may result in two different diameters between the outer and inner ends of the cage halves. These different diameters of the cage can also be caused by non-uniform heat expansion, if the ball bearing warms up as a result of friction during operation. All of this leads to a damaging distortion of the cage shell which is constructed of a plastic, e.g. a thermoplastic, and accordingly to an impairment of the efficiency of the known ball bearing.

An object of the present invention is to create an improved ball bearing of the above-described type, which has dimensional accuracy and a simple construction. In addition, it should be possible to manufacture the ball bearing with inexpensive means.

SUMMARY OF THE INVENTION

The above-described objects are accomplished by provision of axially directed guide walls for the balls of the load zone, axially open guide channels for the balls of the direction-reversal zone, and axially directed guide channels for the balls of the return zone, all are formed by an abrasion-resistant plastic part, which is injection molded about the supporting shell. The plastic part can therefore be fastened economically, in the injection molding process, to the metallic supporting shell, using axial slides or ribs exclusively. On the injection molding, axially displaceable fingers of the injection mold engage the guide channels, providing high accuracy of dimensions and shape to this plastic part. Furthermore, this dimensional and shape accuracy is not altered after the injection process, since the shrinkage of the plastic part remains limited to a minimum amount by the incorporated, reinforcing supporting shell. Accordingly, any supplemental or clean-up work on the plastic part after the injection molding is unnecessary. Finally, the supporting shell, which is surrounded by the plastic molding, is dimensionally stable if heated up in operation, since the reinforcing metallic supporting shell prevents a damagingly high heat expansion of the plastic part.

According to a special characteristic of the invention, the supporting shell has longitudinal ribs, which are distributed over its outer circumference and extend to the casing surface of the plastic part. By such means, the supporting shell can be fastened via the longitudinal ribs directly in the bore of the housing, that is without resorting to an outer shell, so that an exceptionally stiff support of the new ball bearing in the bore of the housing results, by a relatively simple, economical construction.

According to a further characteristic of the invention, the longitudinal ribs are connected in one piece with the supporting shell; these ribs insure that the plastic part does not turn on the supporting shell.

In accordance with the invention, the walls of the axially directed guide channels are fashioned to surround the balls closely i.e. to have closely corresponding diameters, so that a trouble-free return of the balls not under load can be effected, in these channels, without jamming or abrasion.

Details and further characteristics of the invention are described in greater detail in the following text, by means of an example of the operation as illustrated by the corresponding drawings.

DETAILED DESCRIPTION OF THE PREFERRED EMBODIMENT

Figure 2:
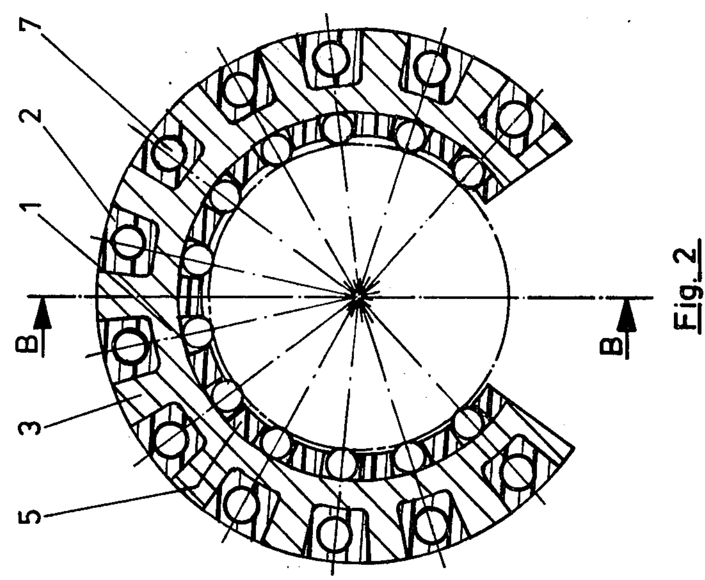
FIG. 2 shows a cross section along the line A—A of the ball bearing shown in FIG. 1.
Figure 1:
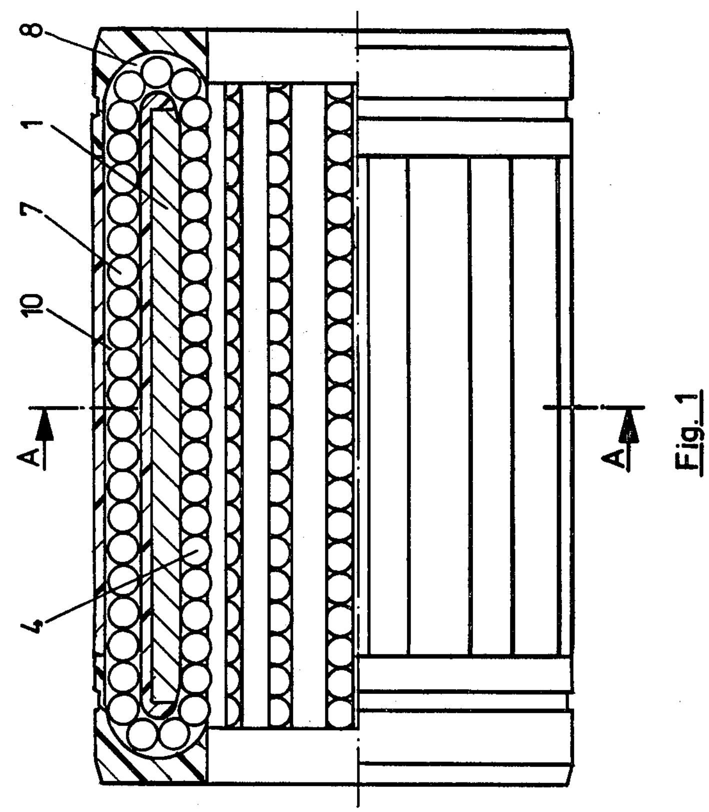
FIG. 1 shows a partial longitudinal section through a preferred embodiment of the new ball bearing.

In FIGS. 1 and 2, 1 denotes a metallic supporting shell or sleeve which can be manufactured from a steel suitable for ball bearings. Part 2, which consists preferably of an abrasion-resistant, thermoplastic material, is injection molded with approximately uniform wall thickness about the supporting shell 1. At the outer circumference of the shell 1 there are arranged longitudinal ribs 3, which are integral with this supporting shell and extend to the outer surface of the plastic part 2; this shell can be supported in the bore of a housing (not shown) by engagement by the outer surface of these ribs with the bore surface. The balls 4 of the load zone run in the cylindrical bore of the supporting shell 1 and support a shaft 5 (drawn with alternating dots and dashes in FIG. 2). In operation, these balls 4 are guided between the axially directed guide walls 6 of the plastic part 2. Balls 7, which are not under load, are turned around at the end of the supporting shell in the axial, open guide channels 8 of the plastic part 2. The guide channels 8 are covered by the end ring 9 at each end of the supporting shell 1. The balls 7 of each ball race, which are not under load, are returned in the axially directed guide channels 10, which are provided outside of the supporting shell, so that endless circulating ball races are formed at the circumference of the ball bearing.

Figure 4:
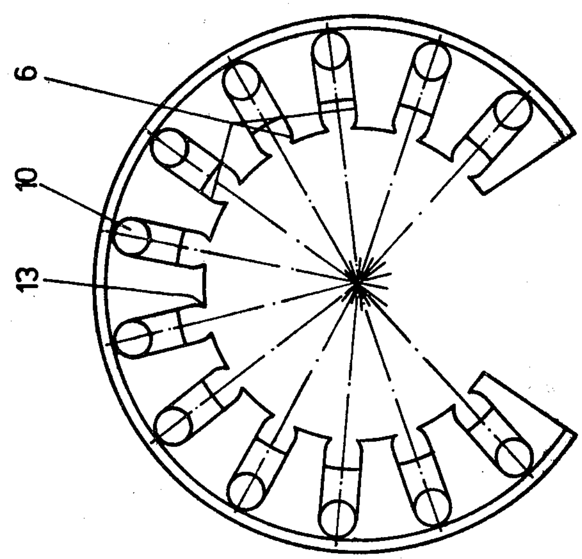
FIG. 4 shows an end view of the supporting shell shown in FIG. 3, with the surrounding plastic part.
Figure 3:
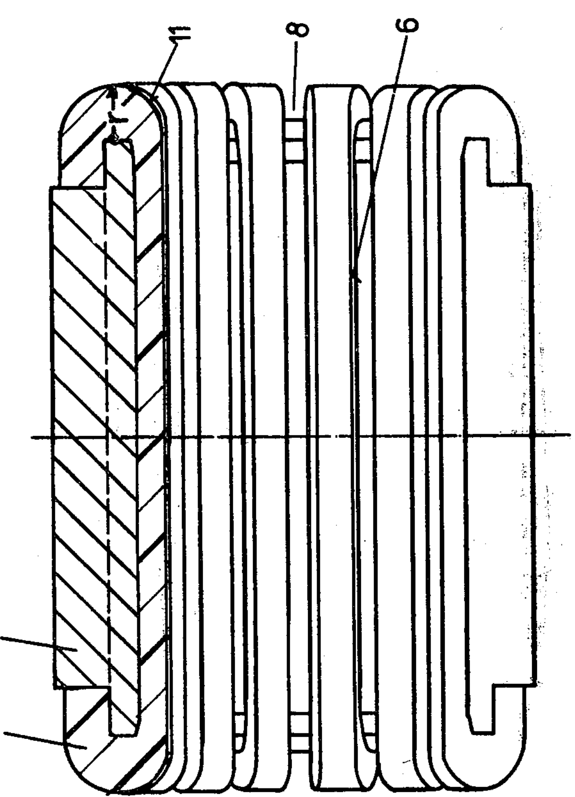
FIG. 3 shows a longitudinal section along the line B—B in FIG. 2 through the supporting shell, about which a plastic part has been injection molded.

FIGS. 3 and 4 show only the supporting shell 1 with the surrounding, injection molded plastic part 2. It can be seen that the guide walls 6 and the guide channels 8 and 10 can be manufactured without difficulty by the injection molding process. In order to produce very exact guide channels 8 and 10 and guide walls 6 when injection molding, it is merely necessary to fix axially projecting ribs in the injection mold. This accuracy is not endangered during the injection molding process and while cooling the plastic part 2 after injection molding, since the metallic supporting shell, which supports the plastic part 2, prevents damaging changes in shape thus an advantageously firm connection of the plastic part 2 on the supporting shell 1 is not effected by the shrinkage of the plastic part 2 on cooling. Because of the high accuracy in manufacture, the walls of the axially directed guide channels 10 can be fashioned to enclose the balls 7 closely, so that the balls 7 can always be returned without jamming in these guide channels 10.

Figure 5:
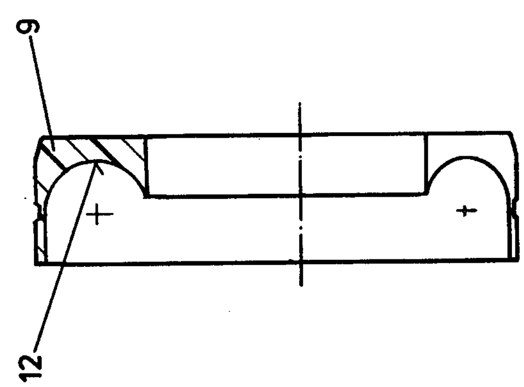
FIG. 5 shows a longitudinal section along the line B—B in FIG. 2 through an end ring.

As can be seen in FIG. 3, the ribs 3 have length less than the overall length of the bearing, and both axial ends of the plastic part 2 have curved or, bulge-shaped surfaces 11 that extend axially beyond the ends of the ribs. The cross sectional radius r of these areas 11 correspond to the concave ring surface 12 of the end ring 9 shown in FIG. 5, which is also manufactured from a plastic material and which can be fastened to this plastic part 2, for example, by gluing or by ultrasonic welding. As further shown in FIG. 3, this radius r is greater than the thickness of the plastic part 2 extending radially inward from ribs 3. In other respects, the axially directed guide channels 6 have walls, which converge somewhat at their radial inner edges 13, so that the balls 4 cannot fall out of the ball bearing in its fully assembled state.

The new ball bearing has the advantage of having high dimensional and shape accuracy, which is altered little even upon warming in operation and/or by ageing of the plastic part 2. By these means all balls 4 and 7 in the ball bearing are guided very accurately along the guide wall 6 or in the guide channels 8 and 10, which are constructed of impact damping, abrasion-resistant plastic.

Figure 6:
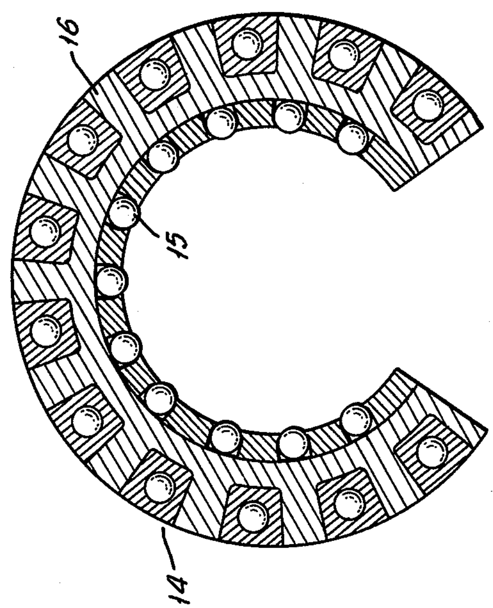
FIG. 6 is a cross section similar to FIG. 2 showing another embodiment.

The invention is, of course, not limited to the above-described example, but can be altered within the scope of the inventive concept. For example, instead of an open supporting shell, the ball bearing can have a closed ring-shaped shell, that has endless circulating rows of balls distributed uniformly about the circumference. Furthermore, the change in direction of the balls, at the two ends of the supporting shell, can take place at an angle to the radial plane going through the bearing axis, so that the longitudinal ribs of the supporting shell come to lie radially above the ball races of the balls under load as shown in FIG. 6. Accordingly there exists a stiff support of the ball bearing in the housing 14, with a direct, radial, force transfer between the balls 15 under load over the ball races and longitudinal ribs 16 to the bore of the housing. Furthermore, as a result of path to change in direction of the balls being inclined at an angle to a radial plane of the ball bearing, there is a larger radius in this path to change direction from the load zone to the return zone, as a result of which there is better, less abrupt, change of directional motion of the balls than where the return zone is radially aligned with the associated load zone.

We claim:

1. In a linear-motion ball bearing formed generally as a cylinder having a plurality of circumferentially spaced endless ball races and included balls, each race having an axial load zone, an axial return zone radially outward of said load zone, these load and return zones having adjacent ends, and turn-around zones connecting the ends of said load and return zones, the improvement wherein the bearing comprises a cylindrical shell having a bore surface along which are defined said load zones, a pair of spaced guide walls extending axially along and adjacent each load zone and extending generally radially inward for guiding balls in said load zone, and wherein said return and turn-around zones are respectively axial and curved guide channels for the balls, and said axial guide walls and axial and curved guide channels comprise abrasion-resistant plastic injection-molded onto said bearing shell, the curved guide channels each having an open part facing axially outward, and said bearing further comprising means for covering said open parts and securable thereto.

2. A bearing according to claim 1 wherein said shell has an outer circumference and comprises axially extending ribs distributed about the outer circumference and extending radially outward, with axial grooves defined between each two adjacent ribs, and one of said axial guide channels situated in each of said grooves.

3. A bearing according to claim 2 wherein said ribs and said shell comprise a single integral element.

4. A bearing according to claim 2 wherein said ribs have opposite ends defining between them first axial length, and said curved guide channels extend axially beyond said ribs at both ends thereof.

5. A bearing according to claim 4 wherein said plastic defining said curved guide channels extends in the axial direction beyond the ends of the ribs a distance greater than the distance said plastic extends radially inward from said ribs.

6. A bearing according to claim 2 wherein each of said return zones is radially aligned with an associated load zone.

7. A bearing according to claim 2 wherein each of said ribs is radially aligned and outward of one load zone.

8. A bearing according to claim 7 wherein the return zone guide channel associated with each load zone is circumferentially displaced from such load zone in addition to being radially outward therefrom, thereby producing in the associated turn-around zone a greater radius than the radius where the return zone is radially aligned with its associated load zone.

9. A bearing according to claim 2 wherein said ribs and return zone channels have outer surfaces with the same radius, which surfaces define the outer circumference of the bearing.

10. A bearing according to claim 1 wherein said axial guide channels defining said return zones have a diameter conforming closely to the diameter of said balls for providing a closely fitting passage.

11. A bearing according to claim 1 wherein said injection molded guide walls and curved and axial guide channels comprise a single, contiguous element.

12. A bearing according to claim 1 wherein said shell is metal.

13. A bearing according to claim 1 wherein for each load zone, each pair of said guide walls extending radially inward, converge slightly for keeping said balls from falling out of said race.

* * * * *